Jan. 1, 1952 — M. S. NEWMAN — 2,581,282
1-HYDROXY-6-ALKOXY-4-METHYLHEXENE-4-YNE-2
AND LOWER FATTY ACID ESTERS THEREOF
Filed May 10, 1947 — 2 SHEETS—SHEET 1

Propargyl alcohol + butylmagnesium chloride + 4-methoxybutanone-2.

↓

Hydrolyzed with ammonium chloride solution - Separated-Concentrated and distilled.

↓

6-methoxy-4-methylhexyne-2-diol-1,4.

↓

Dissolved in pyridine - Acetic anhydride added - Distilled.

↓

1-acetoxy-4-hydroxy-6-methoxy-4-methylhexyne-2.

↓

Mixed with crushed potassium acid sulphate - Distilled - Fractionated.

↓

1-acetoxy-6-methoxy-4-methylhexene-4-yne-2.

↓

Added to solution of sodium methoxide in absolute methanol - Organic Product Isolated.

↓

1-hydroxy-6-methoxy-4-methylhexene-4-yne-2.

↓

Dissolved in pyridine and added to solution of thionyl chloride in pyridine - Heated - Poured into water - Distilled under Reduced Pressure.

↓

1-chloro-6-methoxy-4-methylhexene-4-yne-2.

↓

| Dissolved with sodium iodide in acetone - Stirred - Refluxed - Filtered - Concentrated - Extracted with ether - Washed - Dried - Distilled. | Dissolved with sodium bromide in methanol - Solvent removed - Extracted with ether - Washed - Dried - Distilled. |

↓

1-iodo-6-methoxy-4-methylhexene-4-yne-2.   1-bromo-6-methoxy-4-methylhexene-4-yne-2.

Fig 1

INVENTOR.
Melvin Spencer Newman
BY
HIS ATTORNEY

Jan. 1, 1952

M. S. NEWMAN 2,581,282

1-HYDROXY-6-ALKOXY-4-METHYLHEXENE-4-YNE-2
AND LOWER FATTY ACID ESTERS THEREOF

Filed May 10, 1947

$$X-CH_2-C\equiv C-\underset{\underset{CH_3}{|}}{C}=CH-CH_2OCH_3$$

Fig 3

$$Cl-CH_2-C\equiv C-\underset{\underset{CH_3}{|}}{C}=CH-CH_2OCH_3$$

Fig 4

$$BrCH_2-C\equiv C-\underset{\underset{CH_3}{|}}{C}=CH-CH_2OCH_3$$

Fig 5

$$ICH_2-C\equiv C-\underset{\underset{CH_3}{|}}{C}=CH-CH_2OCH_3$$

Fig 6

$$HOCH_2-C\equiv C-\underset{\underset{CH_3}{|}}{C}=CH-CH_2OCH_3$$

Fig 7

$$CH_3-\underset{\underset{O}{\|}}{C}-O-CH_2-C\equiv C-\underset{\underset{CH_3}{|}}{C}=CH-CH_2OCH_3$$

Fig 8

$$CH_3\underset{\underset{O}{\|}}{C}-O-CH_2-C\equiv C-\underset{\underset{OH}{|}}{\overset{\overset{CH_3}{|}}{C}}-CH_2-CH_2OCH_3$$

Fig 9

$$HOCH_2-C\equiv C-\underset{\underset{OH}{|}}{\overset{\overset{CH_3}{|}}{C}}-CH_2-CH_2OCH_3$$

INVENTOR.
Melvin Spencer Newman
BY
HIS ATTORNEY

Patented Jan. 1, 1952

2,581,282

UNITED STATES PATENT OFFICE 2,581,282

1-HYDROXY - 6 - ALKOXY - 4 - METHYL-HEXENE-4-YNE-2 AND LOWER FATTY ACID ESTERS THEREOF

Melvin S. Newman, Columbus, Ohio, assignor to Ohio State University Research Foundation, Columbus, Ohio, a corporation of Ohio Application May 10, 1947, Serial No. 747,177

11 Claims. (Cl. 260—488)

This invention relates to new compounds or compositions of matter useful as intermediates in the synthetic production of vitamin A ethers and similar compounds and to processes for synthesizing such new compounds. It is illustrated by processes of forming a 1-hydroxy-6-alkoxy-4-methylhexene - 4 - yne - 2 and its organic and halogen acid esters. Examples of such organic acid esters are the acetate, propionate, butyrate, trimethylacetate and benzoate. Examples of such halogen acid esters are 1-chloro-6-methoxy-4 - methylhexene-4-yne-2, 1-iodo-6-methoxy-4-methylhexene - 4 - yne-2, and 1-bromo-6-methoxy-4-methylhexene-4-yne-2.

The specific hydroxy alkoxy methylhexene-ynes which I have synthesized have all had alkoxy groups.

By the use of the word "alkoxy" in the last sentence, elsewhere in this specification and in the claims, I mean a compound having an alkyl radical attached to the remainder of the molecule by oxygen where the alkyl group has not more than six carbon atoms and preferably not more than four carbon atoms and I so define the term "alkoxy" wherever used herein. Compounds having an alkyl group with more than four carbon atoms are operative but in subsequent reactions the compounds involved may be more difficult to handle due to higher boiling temperatures.

Other intermediate products synthesized during one of the processes used by me in forming the above identified hydroxy alkoxy methylhexene-ynes include 6 - methoxy - 4 - methylhexyne - 2 - diol-1,4 and 1-acetoxy-4-hydroxy-6-methoxy-4-methylhexyne-2. Prior to my discoveries there has been no recognized method of preparing any of the compounds referred to above. Nor had these compounds been previously synthesized or isolated.

One of the objects of my invention therefore is the production of new intermediate chemical compounds useful in the synthesizing of vitamin A ethers, similar compounds and other chemicals.

Another object of my invention is the provision of new methods of synthesizing various intermediates and other chemicals.

A further object of my invention is the provision of new compounds of the formula

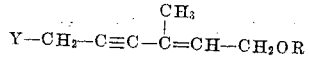

where Y represents a member of the class consisting of the hydroxyl group and esters of the hydroxyl group and R represents a lower alkyl radical having not more than six carbon atoms.

A further object of my invention is the provision of new methylhexene-ynes including such compounds as 1 - hydroxy - 6 - alkoxy-4-methylhexene-4-yne-2 and halogenated methylhexene-ynes, and of methods for synthesizing such compounds.

Further objects and features of my invention will be apparent from the following specification and claims when considered in connection with the accompanying drawings illustrating embodiments of my invention.

In the drawings:

Fig. 1 illustrates a method according to my invention of synthesizing some of the new compounds invented by me;

Fig. 2 shows the structural formula of a halo "alkoxy" methylhexene-yne which may be synthesized by my processes, and which corresponds to the general formula

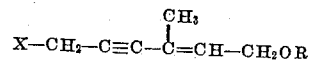

where Y is shown as X which is a halogen and R is the methyl radical;

Fig. 3 shows the structural formula of a chloro methylhexene-yne which may be synthesized by my process, and which corresponds to the formula of Fig. 2 where X is a chlorine atom;

Fig. 4 shows the structural formula of a bromo methylhexene-yne which may be synthesized by my processes and which corresponds to the formula of Fig. 2 where X is a bromine atom;

Fig. 5 shows the structural formula of an iodo methylhexene-yne which may be synthesized by my processes and which corresponds to the formula of Fig. 2 where X is an iodine atom;

Fig. 6 shows the structural formula of a hydroxy "alkoxy" methylhexene-yne which may be synthesized by my processes and which corresponds to the formula

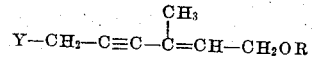

where Y is the hydroxyl and R is the methyl radical;

Fig. 7 shows the structural formula of an acetoxy methoxy methylhexene-yne which may be synthesized by one of my processes, and which also corresponds to the above formula where Y is the acetoxy radical and R is the methyl radical;

Fig. 8 shows the structural formula of an acetoxy hydroxy methoxy methylhexyne which is formed as an intermediate product during the manipulation of one of my processes leading to the synthesis of the new methylhexene-ynes disclosed herein; and Fig. 9 shows the structural formula of a methoxy methylhexynediol which is also formed as an intermediate during the manipulation of one of my processes leading to the synthesis of the new methylhexene-ynes disclosed.

In general, the processes covered hereby relate to the synthesis of a 1-hydroxy-6-alkoxy-4-methylhexene-4-yne-2 and its esters. One method thereof comprises the alcoholysis of a 1-acyloxy-6-alkoxy-4-methylhexene-4-ynes to a 1-hydroxy-6-alkoxy-4-methylhexene-4-yne-2. This last named product may be then reacted with suitable halogen acid derivatives to form halogen esters (alkyl halides).

The 1-acyloxy-6-alkoxy-4-methylhexene-4-yne-2 is an ester of the 1-hydroxy-6-alkoxy-4-methylhexene-4-yne-2 as are also the halogen esters which may be prepared therefrom. Although in the process described hereinafter the alcohol is obtained from the acyloxy ester, the acyloxy ester may be obtained from the alcohol if desired.

Preferably I form the acyloxy ester by dehydrating a 1-acyloxy-4-hydroxy-6-alkoxy-methylhexyne-2, although the acyloxy ester may within the scope of my invention be formed in any other desired way and then alcoholized according to my invention to form the 1-hydroxy-6-alkoxy-4-methylhexene-4-yne-2.

The alcoholysis of the 1-acyloxy-6-alkoxy-4-methylhexene-4-yne-2 may be accomplished by heating with a metal alcoholate in an anhydrous alcohol solution and then isolating and purifying. Preferably the metal alcoholate is prepared from the same alcohol as is used as a solvent, the metal alcoholate serving as a catalyst to the reaction of the alcohol with the methylhexene-yne. For example, I may use corresponding sodium, calcium, or aluminum alcoholates in methanol, ethanol, a propanol or a butanol.

The halogen esters may be prepared by reacting the 1-hydroxy-6-alkoxy-4-methylhexene-4-yne-2 with a halogen-containing-acid derivative such as, for example, thionyl chloride, thionyl bromide, phosphorus trichloride, phosphorus tribromide and phosphorus pentachloride in an inert solvent in the presence of a tertiary-amine-binding agent such as pyridine, the picolines, the lutidines, quinoline, the dialkyl anilines, or the alkyl amines. The bromides and iodides may be prepared (and in certain cases may be prepared more easily) by replacing the chlorine by bromine or iodine as, for example, by refluxing the chloride with an inorganic iodide or bromide such as sodium iodide, potassium iodide, sodium bromide or potassium bromide in a solvent such as acetone or methanol.

The dehydration of the 1-acyloxy-4-hydroxy-6-alkoxy-4-methylhexyne-2 to a 1-acyloxy-6-alkoxy-4-methylhexene-4-yne-2 may be accomplished by heating with a suitable dehydrating agent, such as, for example, potassium acid sulfate or phenyl isocyanate or other isocyanates in a vacuum or in the absence of oxygen or in an inert atmosphere, the distillate being collected in fractions and used as such or fractionated again if desired.

The preparation of a 1-acyloxy-4-hydroxy-6-alkoxy-4-methylhexyne-2 is not described in detail nor claimed in this application. It is so described and is claimed in copending application Serial No. 747,178, now Patent No. 2,555,362. However, in order to completely disclose at least one complete example of my method of forming a 1-hydroxy-6-lower alkoxy-4-methylhexene-4-yne-2 and its organic and halogen esters, I have shown below one specific method of synthesizing 1-hydroxy-6-methoxy-4-methylhexene-4-yne-2 including in such disclosure a specific method of forming a 1-acetoxy-4-hydroxy-6-methoxy-4-methylhexyne-2 as an intermediate. This specific example is illustrated in the drawings Figs. 1 to 9, inclusive, but especially in Fig. 1. The specific example, however, is merely illustrative and is not to be considered as constituting the invention covered hereby.

In general, the processes illustrated in Fig. 1 comprise the reaction of propargyl alcohol with butylmagnesium chloride to produce a propargyl Grignard complex; the reaction of the complex with 4-methoxybutanone-2; the hydrolysis of the product; the acetylation thereof by the addition of acetic anhydride; the distillation of the product thereof; the dehydration thereof by heating the product with crushed potassium acid sulfate; the distillation and fractionation of the product; the alcoholysis thereof by the addition of the product to a solution of sodium methoxide in an alcohol (preferably methanol); the isolation of the organic product; the esterification of the product by the reaction thereof with a solution of a thionyl halide; the heating thereof; the isolation thereof; and the distillation thereof. I may then react the product (if not an iodide) with a solution of a metallic (e. g. sodium) iodide in acetone, reflux the product, extract it with acetone, reflux the product, extract it with ether, and distill it to produce an iodo methylhexene-yne. If a chloride is formed from the hydroxy alkoxy methylhexene-yne, I may alternately react the chloride with an inorganic bromide (as, for example, sodium bromide, potassium bromide or calcium bromide) in acetone to form a bromomethylhexene-yne. If any one of several other alkoxy butanones is used as a starting material, a different halogenated alkoxy methylhexadiene is produced. For example, instead of using 4-methoxybutanone-2, any other alkoxy butanone or similar butanone (such as, for example, ethoxy butanone, benzyloxy butanone or cyclohexyloxy butanone) may be used to produce useful products. The products obtained by these methods are intermediate products useful in the synthetic production of vitamin A compounds and as intermediates for the synthetic production of other chemicals.

The reactions involved in the processes illustrated in Fig. 1 are as follows:

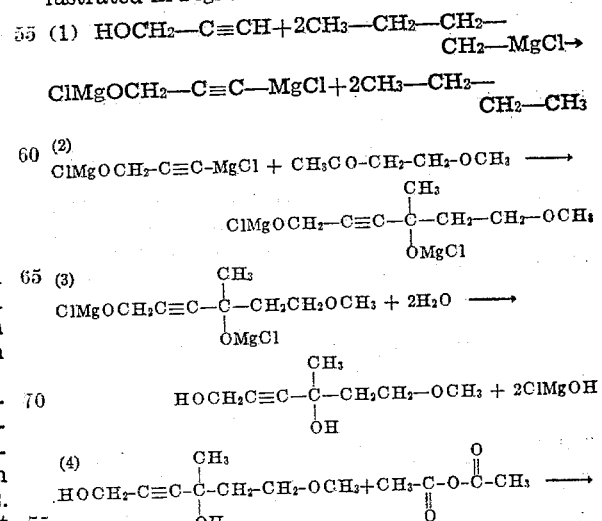

(5)
$$CH_3-C(=O)-O-CH_2-C\equiv C-C(CH_3)(OH)-CH_2-CH_2-OCH_3 + CH_3COOH$$

$$CH_3-C(=O)-O-CH_2-C\equiv C-C(CH_3)(OH)-CH_2-CH_2-OCH_3 \xrightarrow{KHSO_4}$$

(6)
$$CH_3-C(=O)-O-CH_2-C\equiv C-C(CH_3)=CH-CH_2-OCH_3 + H_2O$$

$$CH_3-C(=O)-O-CH_2-C\equiv C-C(CH_3)=CH-CH_2-OCH_3 + CH_3OH \xrightarrow{NaOCH_3}$$

(7)
$$HOCH_2-C\equiv C-C(CH_3)=CH-CH_2OCH_3 + CH_3COOCH_3$$

$$HOCH_2-C\equiv C-C(CH_3)=CH-CH_2OCH_3 + SOCl_2 \longrightarrow$$

(8)
$$ClCH_2-C\equiv C-C(CH_3)=CH-CH_2OCH_3 + SO_2 + HCl$$

$$ClCH_2-C\equiv C-C(CH_3)=CH-CH_2OCH_3 + NaI \longrightarrow$$

(9)
$$ICH_2-C\equiv C-C(CH_3)=CH-CH_2OCH_3 + NaCl$$

$$ClCH_2-C\equiv C-C(CH_3)=CH-CH_2OCH_3 + NaBr \longrightarrow$$

$$BrCH_2-C\equiv C-C(CH_3)=CH-CH_2OCH_3 + NaCl$$

The bromide may also be synthesized direct from the hydroxy methoxy methylhexene-yne as follows:

(10)
$$HOCH_2-C\equiv C-C(CH_3)=CH-CH_2OCH_3 + SOBr_2 \longrightarrow$$

$$BrCH_2-C\equiv C-C(CH_3)=CH-CH_2OCH_3 + SO_2 + HBr$$

The following Examples I to VI, inclusive, are presented in illustration of my invention.

EXAMPLE I

*Preparation of 1-acetoxy-6-methoxy-4-methyl-hexene-4-yne-2*

A mixture of 109.5 g. (.55 mole) of 1-acetoxy-4-hydroxy-6-methoxy-4-methyl-hexyne-2 and 80 g. (.58 mole) of crushed potassium acid sulfate were placed in a distilling flask. The mixture was heated under reduced pressure until distillate was formed. Keeping the bath temperature as low as possible 73 g. of material (B. P. 96–115° at 3 mm.) was collected. This material was fractionated through a one foot helices packed column fitted with a total reflux partial take off head. The desired product was collected at 100–106° at 4 mm.; yield=44.5 g. (45%); $n_D^{20}=1.4773$.

*Analysis.*—Calcd. for $C_{10}H_{14}O_3$: C, 65.9; H, 7.7. Found: C, 66.1, 65.7; H, 8.0, 8.1.

The product has the following structural formula:

$$CH_3-C(=O)-O-CH_2-C\equiv C-C(CH_3)=CH-CH_2OCH_3$$

EXAMPLE II

*Preparation of 1-hydroxy-6-methoxy-4-methyl-hexene-4-yne-2.*

To a solution of 2 g. (.037 mole) of sodium methoxide in 100 c.c. of absolute methanol was added 8.5 g. (.047 mole) of 1-acetoxy-6-methoxy-4-methylhexene-4-yne-2. The solution was refluxed for two hours. The methanol was removed under reduced pressure and the organic product isolated after dilution with water by extraction with ether. The product was obtained as a pale yellow oil; B. P. 76–78° at 0.3 to 1 mm.; yield=5.0 g. (76%); $n_D^{26}=1.4903$.

*Analysis.*—Calcd. for $C_8H_{12}O_2$: C, 68.5; H, 8.6. Found: C, 68.7, 68.7; H, 8.8, 9.0.

The product has the following structural formula:

$$HOCH_2-C\equiv C-C(CH_3)=CH-CH_2OCH_3$$

EXAMPLE III

*Preparation of 1-chloro-6-methoxy-4-methyl-hexene-4-yne-2*

A solution of 9.5 g. (.068 mole) of 1-hydroxy-6-methoxy-4-methylhexene-4-yne-2-ol-1 in 3.1 cc. of dry pyridine was aded over thirty minutes to an ice cold solution of 9.5 g. (.08 mole) of purified thionyl chloride in 3.1 cc. of dry pyridine. The solution was allowed to stand at room temperature for three hours and then heated to 50° for thirty minutes. The product was isolated after pouring the reaction mixture into water, and was obtained as a colorless oil on distillation under reduced pressure; B. P. 51° at 0.5 mm.; yield=8.7 g. (81%); $n_D^{26}=1.4952$.

*Analysis.*—Calcd. for $C_8H_{11}OCl$: C, 60.6; H, 7.0; Cl, 22.4. Found: C, 60.1, 59.8; H, 7.1, 7.1; Cl, 22.0, 21.7.

The product has the following structural formula:

$$Cl-CH_2-C\equiv C-C(CH_3)=CH-CH_2OCH_3$$

EXAMPLE IV

*Preparation of 1-iodo-6-methoxy-4-methyl-hexene-4-yne-2*

A solution of 10 g. (.063 mole) of 1-chloro-6-methoxy-4-methylhexene-4-yne-2 and 15 g. (.10 mole) of sodium iodide in 100 cc. of acetone was stirred at room temperature for two hours, and then heated to reflux for one hour. After filtration and concentration of the filtrate, the product was taken up in ether, washed, dried and distilled. There was obtained 9 g. (57%) of an orange oil; B. P. 85–87°/2 mm.; (75–76° at 0.5 mm.); $n_D^{20}=1.5647$.

*Analysis.*—Calcd. for $C_8H_{11}IO$: C, 38.47; H, 4.4; I, 50.7. Found: C, 39.7, 39.7; H, 4.6, 4.8; I, 46.6, 46.8.

The product has the following structural formula:

$$ICH_2C\equiv C-C(CH_3)=CHCH_2OCH_3$$

EXAMPLE V

*Preparation of 1-iodo-6-methoxy-4-methyl-hexene-4-yne-2*

To a solution of 14 g. of sodium iodide in 100 cc. of acetone was added 10.5 g. of 1-chloro-6-methoxy-4-methylhexene-4-yne-2. The mixture was stirred at room temperature for one hour and was then heated to reflux for one-half hour. The precipitated sodium chloride was removed by filtration and the organic product was isolated by vacuum distillation. The desired iodo-compound was obtained as a pale yellow oil; P. B. 75–76° C. at 1 mm.; $n_D^{20}=1.5647$ in 78% yield.

The product has the following structural formula:

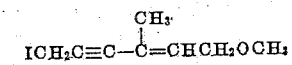

EXAMPLE VI

*Preparation of 1-bromo-6-methoxy-4-methyl-hexene-4-yne-2*

A solution of 8 g. (.05 mole) of 1-chloro-6-methoxy-4-methylhexene-4-yne-2 and 10 g. (.10 mole) of sodium bromide in 100 cc. of absolute methanol was refluxed for three hours with stirring. After removal of most of the methanol under reduced pressure, the product was taken up in ether, washed, dried and distilled. There was obtained an orange oil; B. P. 58.5–61° C. at 0.5 mm.; yield=7.5 g. (75%); $n_D^{20}$=1.5088. The product has the following structural formula:

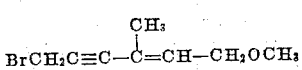

While the forms of embodiments of the present invention as herein disclosed constituted preferred forms, it is to be understood that other forms might be adopted, all coming within the scope of the claims which follow.

I claim:

1. As a composition of matter, a hexene-yne having a general structural formula of

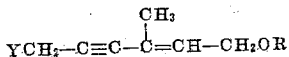

where Y represents a member of the class consisting of the hydroxyl group and fatty acid esters of the hydroxyl group in which the acid component has not more than five carbon atoms and R represents a lower alkyl radical having not more than six carbon atoms.

2. As a composition of matter, a hexene-yne having a general structural formula of

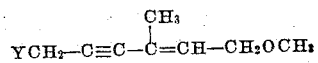

where Y represents a member of the class consisting of the hydroxyl group and fatty acid esters of the hydroxyl group which have not more than five carbon atoms.

3. As a composition of matter, a hexene-yne having a structural formula of

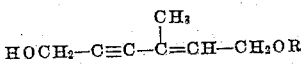

where R represents a lower alkyl radical having not more than six carbon atoms.

4. As a composition of matter, a vitamin A ether intermediate product having a general structural formula of

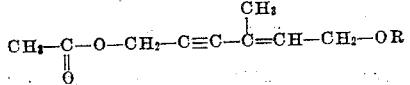

where R represents a lower alkyl radical having not more than six carbon atoms.

5. As a composition of matter, a hexene-yne having a structural formula of

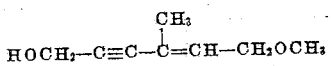

6. As a composition of matter, a vitamin A ether intermediate product having a general structural formula of

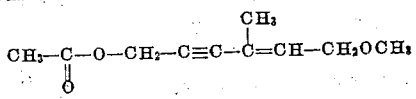

7. A process of synthesizing a vitamin A ether intermediate which comprises the step of dehydrating a 1-acyloxy-4-hydroxy-6-alkoxy-4-methylhexene-2 wherein the acyloxy group is derived from carboxylic acid, with potassium acid sulfate to form a 1-acyloxy-6-alkoxy-4-methylhexene-4-yne-2.

8. A process of synthesizing a vitamin A ether intermediate which comprises the steps of alcoholizing a 1-acyloxy-6-alkoxy-4-methylhexene-4-yne-2, wherein the acyloxy group is derived from carboxylic acid, with a solution of a metal alcoholate dissolved in an alcohol to form a 1-hydroxy-6-alkoxy-4-methylhexene-4-yne-2.

9. A process of synthesizing a vitamin A ether intermediate which comprises the steps of dehydrating a 1 - acyloxy - 4 - hydroxy - 6 - alkoxy-4-methylhexene-2, wherein the acyloxy group is derived from carboxylic acid, to form a 1-acyloxy-6-alkoxy-4-methylhexene-4-yne - 2 and alcoholizing the resulting product to form a 1-hydroxy-6-alkoxy-4-methylhexene-4-yne-2.

10. A process of synthesizing a vitamin A ether intermediate which comprises the steps of dehydrating a 1-acyloxy - 4 - hydroxy - 6 - alkoxy-4-methylhexene-2, wherein the acyloxy group is derived from carboxylic acid, by heating with potassium acid sulfate to form a 1-acyloxy-6-alkoxy-4-methylhexene-4-yne-2; and reacting the product with a solution of sodium methoxide in methanol to form a 1-hydroxy-6-alkoxy-4-methylhexene-4-yne-2.

11. A process of synthesizing a vitamin A ether intermediate which comprises the steps of dehydrating a 1-acyloxy - 4 - hydroxy - 6 - alkoxy-4-methylhexene-2, wherein the acyloxy group is derived from carboxylic acid, by heating with potassium acid sulfate to form a 1-acyloxy-6-alkoxy-4-methylhexene-4-yne-2 and then alcoholizing the resulting product by refluxing with it a solution of sodium methylate dissolved in a methanol to form a 1-hydroxy-6-alkoxy-4-methylhexene-4-yne-2.

MELVIN S. NEWMAN.

REFERENCES CITED

The following references are of record in the file of this patent:

UNITED STATES PATENTS

| Number | Name | Date |
|---|---|---|
| 2,122,716 | Graves | July 5, 1938 |
| 2,253,342 | Mikeska et al. | Aug. 19, 1941 |
| 2,298,186 | Woodhouse | Oct. 6, 1942 |
| 2,369,157 | Milas | Feb. 13, 1945 |
| 2,369,159 | Milas | Feb. 13, 1945 |
| 2,382,085 | Milas | Aug. 14, 1945 |
| 2,382,086 | Milas | Aug. 14, 1945 |
| 2,412,465 | Milas | Dec. 10, 1946 |

OTHER REFERENCES

Heilbron: Jour. Chem. Soc. (London), 1946, pages 27–30.

Johnson: "Acetylenic Compounds," vol. 1, entitled "Acetylenic Alcohols," published 1946. Arnold & Co., London, page 161.